United States Patent [19]
Mocas

[11] 4,098,963
[45] Jul. 4, 1978

[54] VENTED BATTERY CAP

[75] Inventor: Verlin A. Mocas, Indianapolis, Ind.

[73] Assignee: The Richardson Company, Des Plaines, Ill.

[21] Appl. No.: 767,229

[22] Filed: Feb. 9, 1977

[51] Int. Cl.$^2$ ............................................. H01M 2/12
[52] U.S. Cl. ......................................... 429/88; 429/89
[58] Field of Search ........................ 429/86, 87, 88, 89

[56] References Cited

U.S. PATENT DOCUMENTS

| | | | |
|---|---|---|---|
| 3,284,244 | 11/1966 | Lucas | 429/87 |
| 3,879,227 | 4/1975 | Hennen | 429/88 |
| 3,992,226 | 11/1976 | Godshalk | 429/89 |

*Primary Examiner*—Donald L. Walton

[57] ABSTRACT

A vented cap for a multiple cell storage battery comprises a base member having a plurality of integrally molded vent plug portions adapted to fit into individual filler wells of the battery and a cover member which snaps in place over the base member to form a chamber for gas egressing from the battery. The base member includes interior walls and a plurality of integrally molded latch members which engage the rim of the cover member to secure the cover member in abutting relationship to the interior walls. The interior walls are dimensioned to space the rim of the cover member from the rim of the base member whereby a continuous vent slot is formed around the periphery of the cap which allows battery gas to escape from the chamber with wide dispersion while inhibiting inward propagation of an externally generated flame. The latch members may be alternatively provided on the cover member so as to engage the rim of the base member, and the vented cap may also be constructed in single-cell form having a single vent plug portion for insertion into a single battery filler well.

19 Claims, 14 Drawing Figures

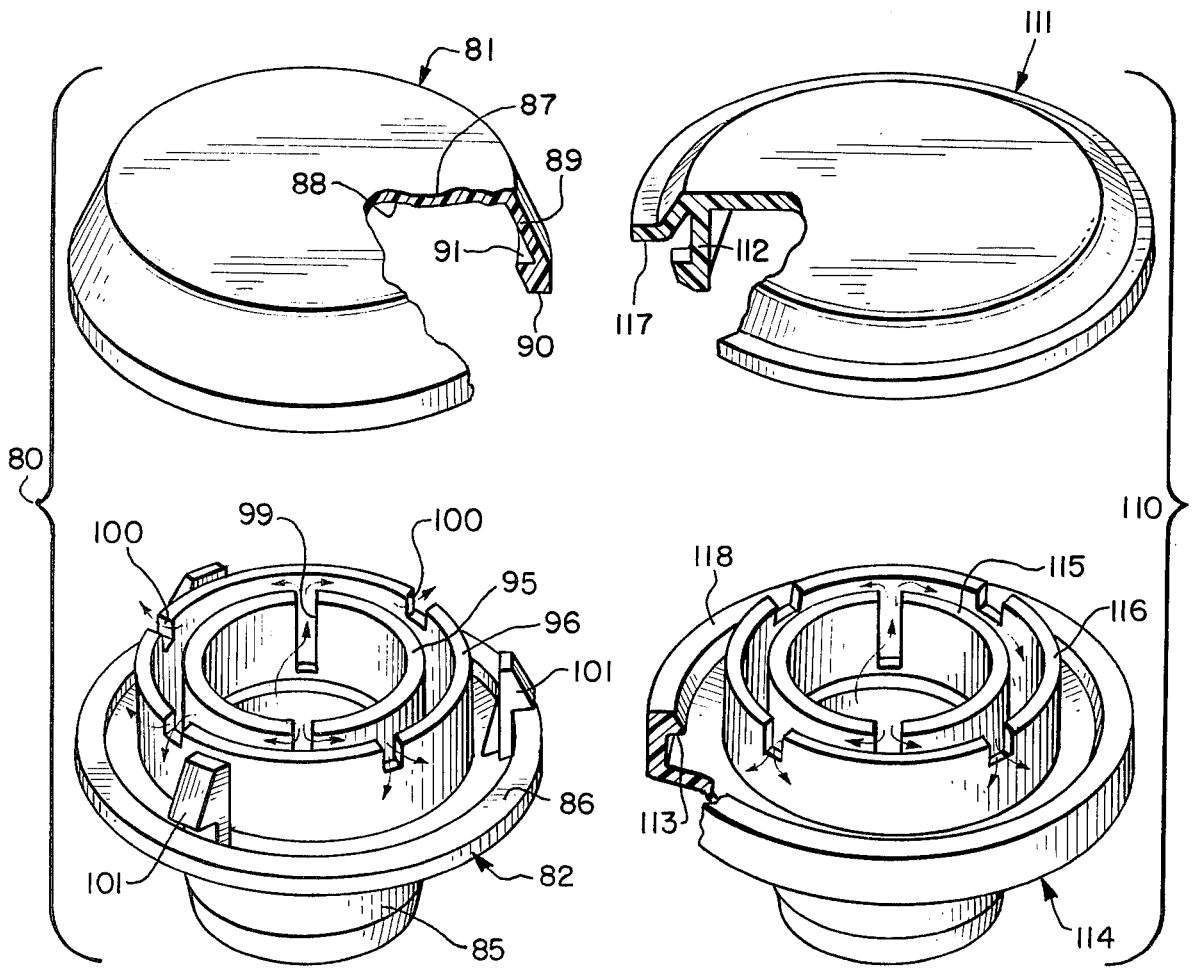
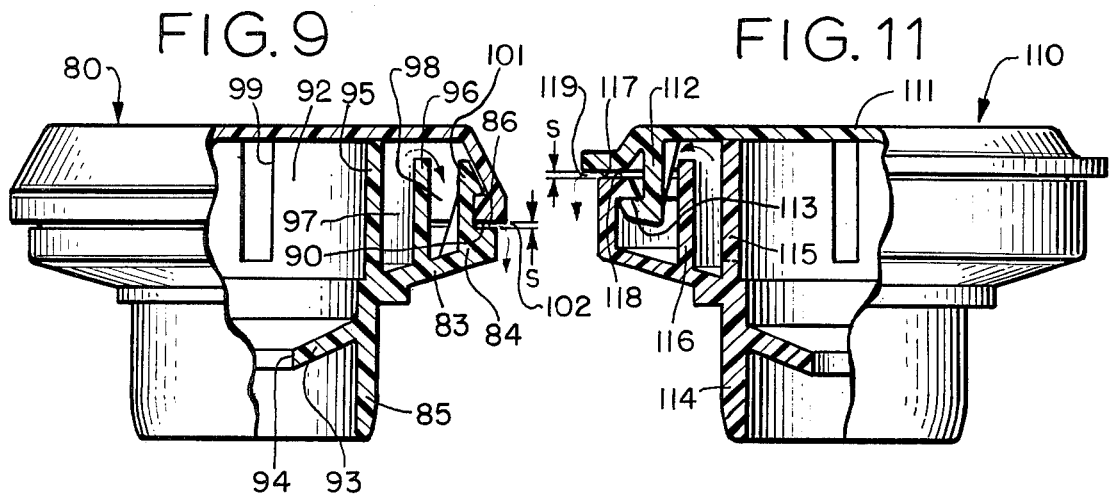

VENTED BATTERY CAP

BACKGROUND OF THE INVENTION

The present invention is directed generally to caps for storage batteries, and more paticularly to a vented battery cap of two-piece snap-together construction which is less costly to manufacture and which provides improved dispersion of egressing battery gas.

Electrical storage batteries of the lead acid type typically comprise a plurality of individual cells each having a filler well through which electrolyte is replenished and through which hydrogen and oxygen gases generated within the cell during operation of the battery are egressed. Various types of vented caps, in both single form for covering a single filler well, and in ganged form for covering multiple filler wells, have been proposed for preventing the electrolyte from spilling or splashing out while allowing the gases developed within the battery to be vented. Such vented caps have relied on either tortuous vent paths, porous internal elements, or critically dimensioned vent apertures to minimize the possibility of the gas igniting and exploding within the battery.

Where critically dimensioned vent apertures have been relied upon, the vent apertures have typically been formed with a dimension to transverse to gas flow of less than approximately 0.007 inches, which corresponds to the minimum wall spacing required for flame propagation by a stoichiometric mixture of hydrogen and oxygen. Even with this critical vent dimensioning, it has been found necessary to also disperse the battery gas as it leaves the cap to prevent development of a persistent external flame at the vent aperture. Previously, this has been accomplished by providing a large number of individual vent apertures around the periphery of the cap, which undesirably complicated the structure of the caps and increased their cost of manufacture.

Typically, prior art vented battery caps, whether single or ganged in form, have been of two-piece construction, including a base member which fits down into the filler well of the battery, and a cover member which is bonded to the base member and cooperates therewith in forming a trap for electrolyte splashed from the battery and an escape path for gas egressing from the battery. The necessity of aligning and then bonding together the base and cover members undesirably added to the cost of manufacture of these prior art battery caps.

The present invention overcomes these shortcomings of prior art battery caps by providing a two-piece snap-together construction which is not only easier to assemble and therefore less costly to manufacture, but also provides improved dispersion for escaping battery gas and therefore improved protection against potentially damaging combustion. Such cost and performance improvements are particularly significant because of the high volume and highly competitive nature of the vented battery cap market.

Accordingly, it is a general object of the present invention to provide a new and improved vented cap for an electrical storage battery.

It is another object of the present invention to provide a new and improved vented battery cap which provides improved dispersion of egressing gases.

It is another object of the present invention to provide a new and improved vented battery cap which is less expensive to manufacture.

It is another object of the present invention to provide a vented battery cap of two-piece snap-together construction which provides improved dispersion of egressing battery gases.

SUMMARY OF THE INVENTION

The invention is directed to a vented cap for an electrical storage battery of the type having at least one filler well through which gas and electrolyte are discharged. The battery cap includes a base member having a bottom portion, a peripheral side wall portion projecting upwardly from the bottom portion and forming a rim portion, at least one hollow vent plug portion projecting downwardly from the bottom portion for insertion into the filler well and including an orifice for establishing fluid communication with the battery, and an interior wall portion projecting upwardly from the bottom portion, and a cover member including a rim portion and forming in conjunction with the base member an expansion chamber for containing gas egressing from the battery. Means including a plurality of integrally molede latch portions project from either the base or cover member and extend into snap-fit engagement with other of these members to secure the cover member in abutting relationship to the interior walls of the base member whereby the rim portions of the cover member and the base member are maintained in spaced relationship to form a vent aperture for escaping battery gas therebetween.

BRIEF DESCRIPTION OF THE DRAWINGS

The features of the present invention which are belived to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 8 is an enlarged exploded perspective view partially broken away showing a single cell vented battery cap constructed in accordance with the invention.

FIG. 9 is a side elevational view partially in cross-section of the battery cap of FIG. 8 in an assembled condition.

FIG. 10 is an enlarged exploded perspective view partially broken away showing an alternative construction for a single cell vented battery cap constructed in accordance with the invention.

FIG. 11 is a side elevational view partially in cross-section of the battery cap of FIG. 10 in an assembled condition.

DESCRIPTION OF THE PREFERRED EMBODIMENT

Figure 1:
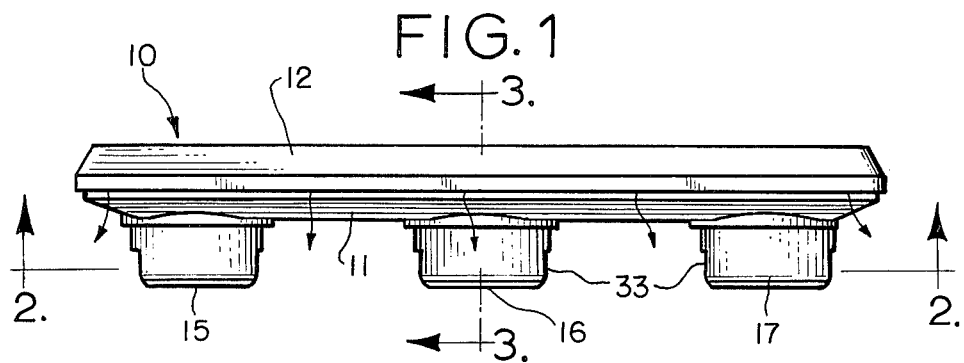
FIG. 1 is a side elevational view of a ganged or multiple cell vented battery cap constructed in accordance with the invention.

Referring to the figures, and particularly to FIGS. 1-5, one illustrated embodiment of a multiple cell vented cap 10 constructed in accordance with the invention includes an elongated generally rectangular base member 11 and a similarly dimensioned cover member 12. Base member 11 includes an elongated generally flat bottom portion 13, four upwardly projecting peripheral side wall portions 14, and three axially downwardly projecting hollow vent plug portions 15-17 having a center-to-center spacing corresponding to that of the filler wells of three adjacent cells of an associated storage battery (not shown).

Figure 2:
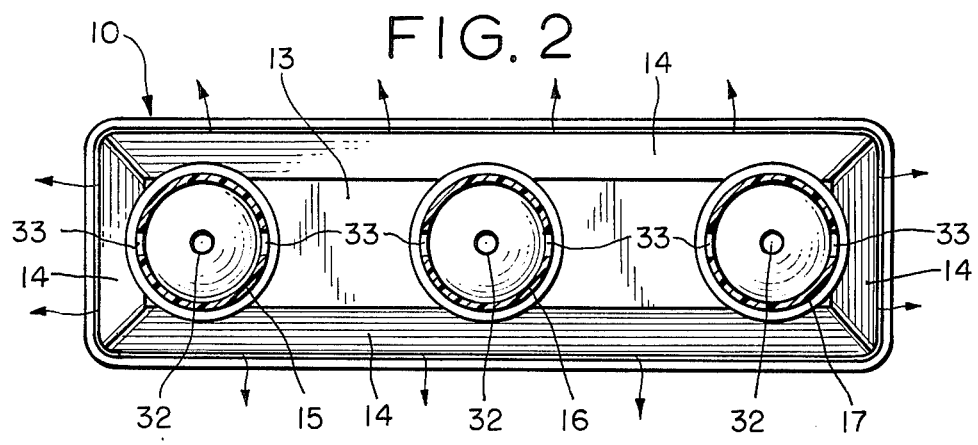
FIG. 2 is a cross-sectional view of the battery cap taken along line 202 of FIG. 1.
Figure 3:
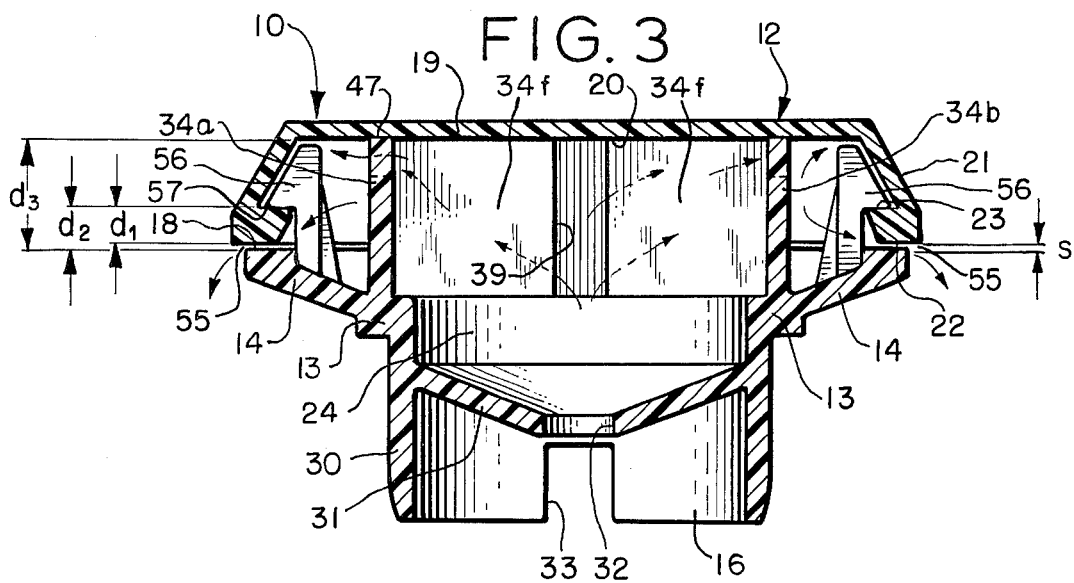
FIG. 3 is an enlarged cross-sectional view of the battery cap taken along 3—3 of FIG. 1.
Figure 4:
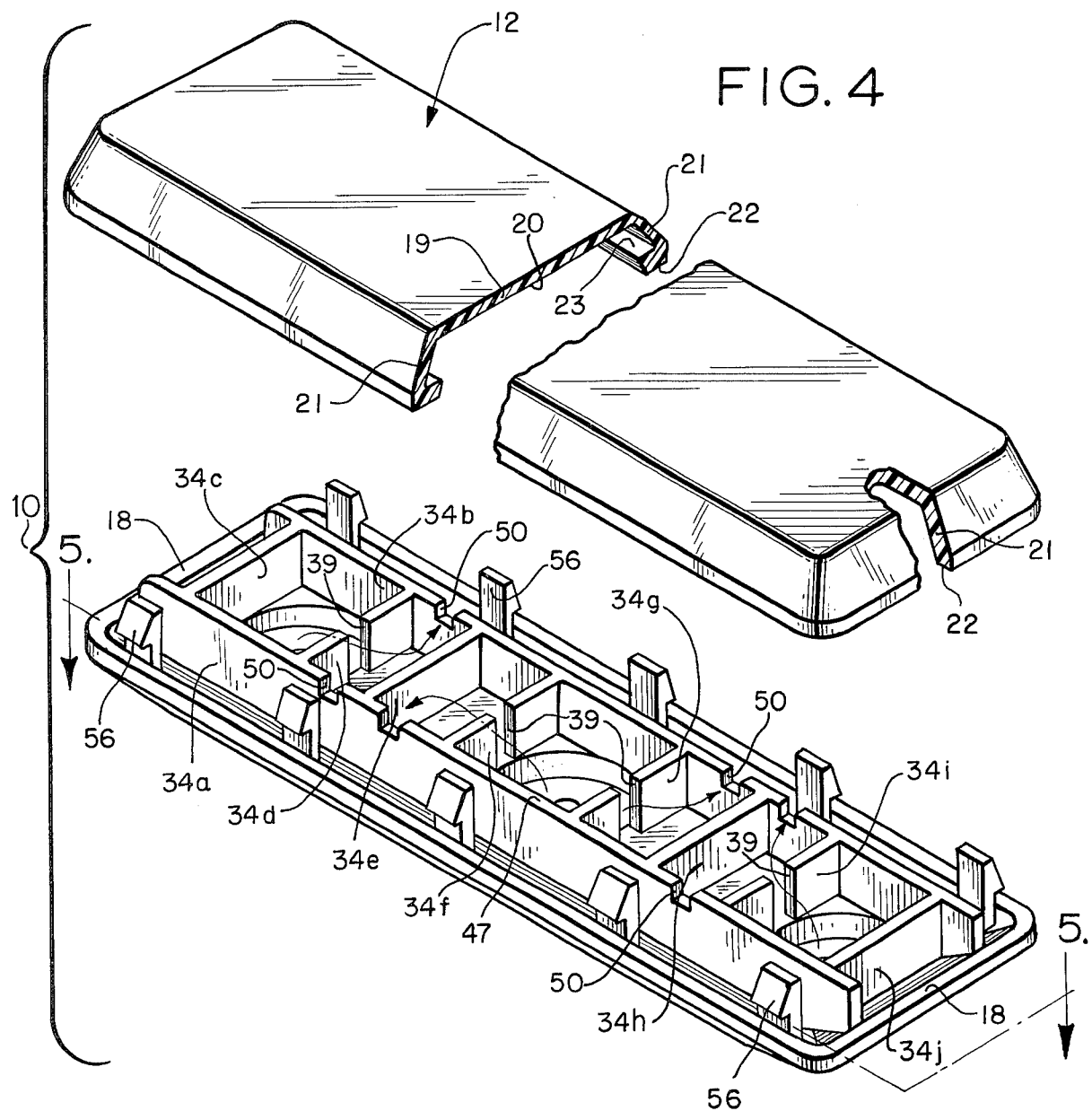
FIG. 4 is an enlarged exploded perspective view of the multiple cell vented battery cap of FIG. 1 partially broken away and partially in cross-section to show the internal construction of the cap.

As seen in FIGS. 3 and 4, the sidewall portions 14 of base member 11 are preferably upwardly and outwardly sloped with respect to the top surface of an underlying storage battery so as to prevent battery gas which might escape from the battery filler wells from accumulating between the under surface of the base member and the top surface of the battery. In the present embodiment the sidewall portions terminate in a single plane above and generally parallel-spaced with respect to the bottom portion 13, forming an upwardly facing rim portion 18. Cover member 12 includes a center portion 19 having a generally flat inside surface 20, and an outwardly and downwardly sloped flange portion 21, which in the present embodiment terminates in a downwardly facing rim portion 22 having an upwardly facing ledge 23. In an assembled condition, as shown in FIGS. 1-3, base member 11 and cover member 12 together form an expansion chamber 24 for accommodating gas and electrolyte egressing from the battery.

The vent plug portions 15-17 of base member 11 each consist of a generally sleeve-shaped axially extending downwardly projecting wall portion 30 having a generally frustoconical interior baffle 31 within which an orifice 32 is centrally disposed. The hollow interior portion of the vent plug communicates with expansion chamber 24 so that gas and electrolyte egressing from the battery enter the chamber, the gas expanding within the chamber and the electrolyte eventually flowing back to the battery through orifice 32 by reason of the funnel-like shape of baffle 31. A plurality of axially extending slots 33 may be provided in the side walls of the vent plugs to obtain a snug fit with the side walls of the battery filler wells (not shown).

Figure 5:
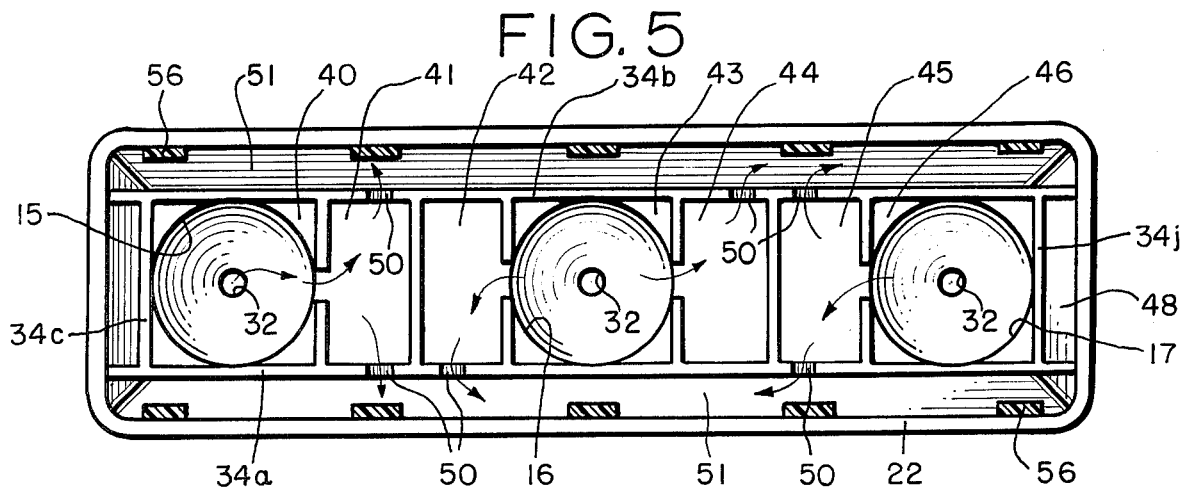
FIG. 5 is a cross-sectional view of the battery cap in an assembled condition taken along line 5—5 of FIG. 4.

For more effective entrapment of battery electrolyte a plurality of upwardly projecting interior wall portions 34a-34j are provided in base member 11 to divide the expansion chamber into a plurality of individual compartments. Referring to FIGS. 4 and 5, these interior wall portions include two parallel-spaced longitudinally extending walls 34a and 34b, and eight transversely extending walls 34c-34j. Walls 34c, 34d and 34e, together with walls 34a and 34b and the center portion 19 of cover member 12, form first and second compartments 40 and 41 (FIG. 5). Compartment 40 is in direct vapor and liquid communication with vent plug 15, and vapor and liquid communication is established between compartment 41 and compartment 40 by an aperture 39 provided in interior wall 34d. Compartments 40 and 41 function in a manner well known to the art to trap electrolyte escaping from vent plug 15, there being no escape path for the liquid from the compartments other than to return to the battery through the orifice of the vent plug. Similarly, interior walls 34e, 34f, 34g and 34h form compartments 42, 43 and 44 in communication with vent plug 16 of base member 11 and serve to entrap electrolyte escaping therethrough, and interior walls 34h, 34i and 34j form compartments 45 and 46 in communication with vent plug 17 and serve to entrap electrolyte escaping therethrough.

In the illustrated embodiment the interior wall portions 34a-34j all terminate in a single plane above and generally parallel-spaced from the bottom portion 13 of base member 11, forming a rim portion 47. To provide an escape path for battery gas within compartments 41, 42, 44 and 45, the longitudinally extending interior walls 34a and 34b each include a plurality of venting slots 50 along their rim portion 47. These slots, which are positioned sufficiently high above the bottom portion 13 of base member 11 to preclude passage of the liquid electrolyte, allow battery gas to pass into a distribution compartment 51 formed between walls 34a and 34b and the flange portion 21 of cover member 12.

From distribution compartment 51 the battery gas is dispersed, in accordance with one aspect of the invention, through a slot-shaped vent aperture 55 (enlarged in FIG. 3 for illustration purposes) formed between the opposing rims 18 and 22 of the base and cover members. This vent aperture extends substantially uninterrupted around the entire periphery of the battery cap, and therefore provides a high degree of dispersion for the battery gas, so as to prevent the occurrence of a persistent flame at any point along the vent aperture should the egressing battery gas be ignited. Furthermore, the vent aperture 55 is preferably formed with a substantially uniform width S, as measured transversely to the direction of flow of the battery gas egressing therethrough, and axially to the cap in the embodiment of FIGS. 1-5, less than the flame quenching distance of the mixture of hydrogen and oxygen gas egressing from the battery to prevent inward propagation of a flame through the vent aperture should the battery gas be ignited externally to the cap. In practice, for a three-cell cap designed for a standard 12 volt automobile-type lead acid storage battery, having an outside length of 4.57 inches and an outside width of 1.36 inches, the vent aperture 55 may have a nominal width $s$ of approximately 0.002 inches, and a length of approximately 0.110 inches, corresponding to the thickness of the rim portions 18 and 22.

As shown in FIG. 3, and in accordance with another aspect of the invention, cover member 12 is secured to base member 11 by means of a plurality of upwardly projecting outwardly facing pawl-shaped latch members 56 integrally molded into the base member. During initial assembly these latch members are inwardly deformed to an extent sufficient to allow the base and cover members to be joined. At that point, the latch members snap back to their original positions as the pawl surfaces 57 of the latch members engage the ledge 23 of cover member 12.

The desired vent aperture width is established by dimensioning the height of interior wall portions 34 such that, when the cover member is locked in position by latch members 56, with its inside surface 20 abutting rim 47, rim portion 18 has the desired spacing $s$ from rim portion 22. For example, in the previously described automotive battery cap embodiment the flange portion 21 of cover member 12 may have a spacing $d_1$ (FIG. 3) between rim 22 and ledge 23 of approximately 0.076 inches, and the pawl surface 57 of each latching member 56 may have a spacing $d_2$ from rim 18 of approximately 0.078 inches. Taking these dimensions into account, when the ledge 23 of cover member 12 is biased up against pawl surface 57 a continuous vent aperture 55 is created around the perihery of the vent cap having a nominal width of 0.002 inches. This provides a wide omnidirectional dispersal path for the escaping gas of sufficient cross-sectional area to reduce the concentration of the gas mixture as it egresses from the cap to a level below that capable of sustaining combustion, and of sufficiently narrow width to prevent inward flame propagation shuld ignition of the gas occur outside the cap. In practice, vent aperture 55 establishes a slight back pressure within expansion chamber 24 during periods of high chemical activity in the battery, as when the battery is being charged at a high rate, which assists in obtaining an even distribution of escaping battery gas along the slot-shaped vent aperture for optimum gas dispersion.

In order that the vent aperture dimension $s$ be accurately miantained, it is necessary that the ledge 23 of cap 12 be held tightly against the pawl surfaces 57 of latching members 56. This is accomplished by dimensioning wall portions 34 such that the spacing $d_3$ (FIG. 3) between rim 47 and rim 18 is slightly greater than the sum of the desired vent aperture width $s$ and the spacing between the inside surface 20 of cover member 12 and rim 22. In the automotive-type battery cap environment previously described rims 18 and 47 are spaced by 0.208 inches, and inside surface 20 and rim 22 are spaced by 0.205 inches. Taking into account the desired 0.002 inch width of vent aperture 55, it is seen that the rim portion of the cap deflects 0.001 inch when secured to the base portion, and in so doing maintains a continuous bias between ledge 23 and the pawl surface 57 of latch member 56.

Figure 6:
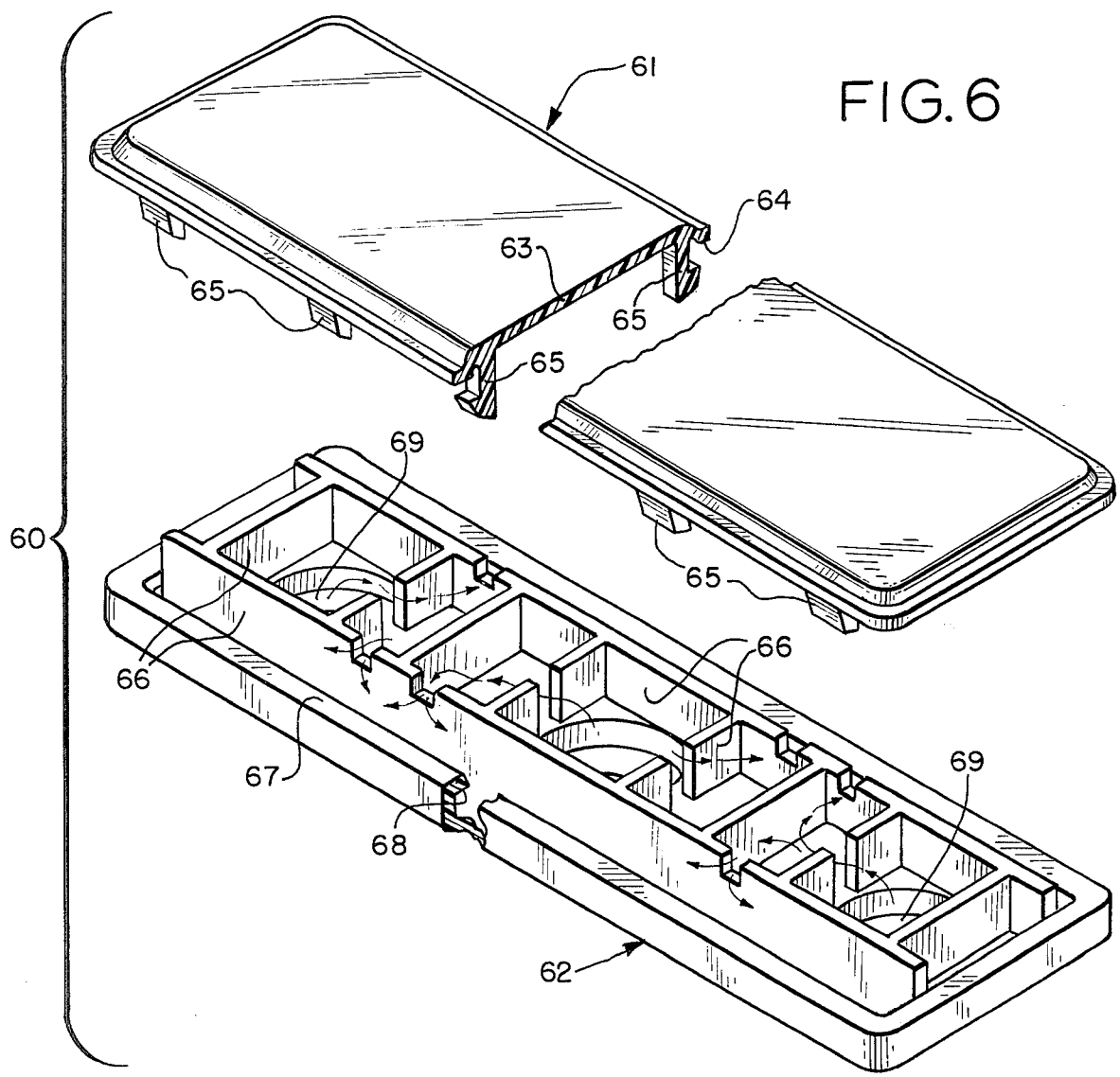
FIG. 6 is an enlarged exploded perspective view partially broken away and partially in cross-section showing an alternative construction for a multiple cell vented battery cap constructed in accordance with the invention.
Figure 7:
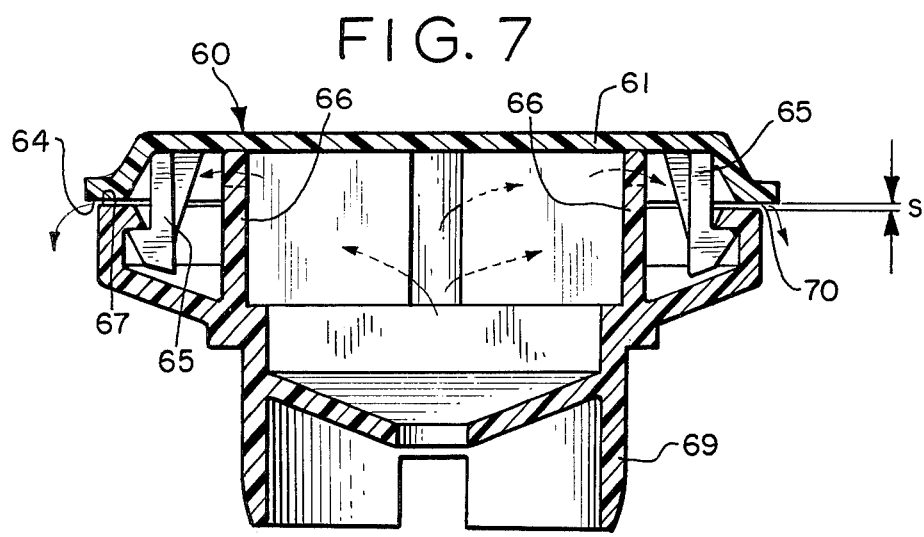
FIG. 7 is a cross-sectional view similar to FIG. 3 of the battery cap of FIG. 6 in an assembled condition.

It is also possible to provide a two-piece snap-together vented battery cap in accordance with the invention wherein latching members are provided on the cover member for engaging the base member. This is illustrated in FIGS. 6 and 7 wherein a vented battery cap 60 is shown which comprises a cover member 61 and a base member 62. Cover member 61, which is similar in structure to cover member 12, includes a generally flat center portion 63 having a downwardly facing peripheral rim portion 64, and a plurality of pawl-like downwardly outwardly facing projecting latch members 65. Base member 61, which is similar to base member 11, includes a plurality of interior wall portions 66, a peripheral upwardly facing rim portion 67, a peripheral downwardly facing ledge portion 68, and three downwardly projecting vent plug portions 69. As in the previously described embodiment of FIGS. 1-5, the spacing between the engaging surfaces of latch members 65 and rim 64, and between rim 67 and ledge 68 is such that when the base and cover members are assembled. a vent aperture 70 having the desired dimension $s$ is formed between rim portions 64 and 67.

The two-piece snap-together construction of the invention is also applicable to a single cell embodiment. One such embodiment is shown in FIGS. 8 and 9, wherein a single cell battery cap 80 includes a cover member 81 adapted for locking engagement with a base member 82. The base member 82 includes a bottom portion 83, an annular upwardly projecting side wall portion 84, and a hollow downwardly projecting vent plug portion 85. The side wall portion terminates in an upwardly facing rim 86. The cover member 81 includes a center portion 87 having a generally flat inside surface 88, and an outwardly and downwardly sloped flange portion 89, which terminates in a downwardly facing circumferential rim portion 90 and an upwardly facing circumferential ledge portion 91. When cap 80 is assembled, as shown in FIG. 9, cover member 81 and base member 82 together form an expansion chamber 92 for accommodating gas and electrolyte egressing from the battery.

As in the multiple cell vent cap embodiments, the vent plug portion 85 is generally sleeve-shaped and includes a frustoconical interior baffle 93 whithin which an orifice 94 is provided to establish fluid and gas communication with the battery cell. For more effective entrapment of electrolyte in expansion chamber 92, a pair of upwardly projecting annular wall portions 95 and 96 are provided on base member 82. When cover member 81 is secured to base member 82, these wall portions form in conjunction with the inside surface 88 of cover member 81 a pair of annular compartments 97 and 98 within expansion chamber 92 which prevent electrolyte from being discharged through the cap. Electrolyte trapped in compartment 97 between the two interior wall portions is allowed to drain back into the vent plug 85 through an aperture 99 provided in wall 96. Gas egressing through compartment 97 flows into compartment 98 through a plurality of apertures 100 provided on the rim of wall 96.

Cover member 81 is secured to base member 82 by means of a plurality of upwardly projecting pawl-like latch members 101 which engage the ledge 91 of cover member 81. AS in the previously described embodiments, the inside surface 88 of cover member 81 is brought into engagement with the rim portions of interior walls 95 and 96, and the latch and ledge portions are spaced to form a slot-like vent aperture 102 between the rim 86 and the rim 90 which extends around the entire circumference of the cap and has a width transverse to the direction of gas flow which is less than the flame quenching distance of the battery gas.

In an alternative single cell embodiment of the vented battery cap of the invention the latch members are provided on the cover member, as shown in FIGS. 10 and 11. In this instance, a vented battery cap 110 includes a cover member 111 and a base member 114. The cover member includes a plurality of downwardly projecting pawl-like latch members 112 and a circumferential downwardly facing rim portion 117. The base member includes a circumferential downwardly facing ledge portion 113, a circumferential upwardly facing rim portion 118, and a pair of concentric annular wall portions 115 and 116 which form compartments within the cap for trapping electrolyte. As in the previously described embodiments, the spacing of rim 117, rim 118, ledge 113, and latch members 112 is such that a vent aperture 119 is formed about the circumference of the cap which has a width transverse to the direction of gas flow which is less than the flame quenching distance of the gas.

Figure 12:
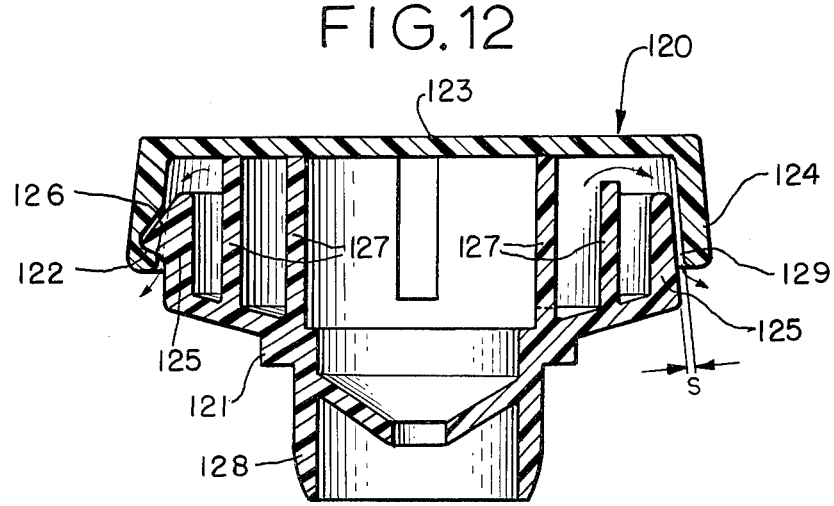
FIG. 12 is a cross-sectional view illustrating another alternative construction for a single cell vented battery cap constructed in accordance with the invention.

The vent aperture formed between the base and cover members in a battery cap constructed in accordance with the invention need not be horizontal with respect to the axis of the cap. In the battery cap 100 of FIG. 12, the base member 101 includes a plurality of inner walls 127, a vent plug portion 128, and a sidewall 125 having a plurality of upwardly projecting pawl-shaped latch portions 122. A cover member 123 secured to the base member includes a sidewall 124 having a ledge portion 126 for engaging the latch portions 122. A generally vertical vent aperture 192 is formed between the inside surface of side wall 124 and the outside surface of sidewall 125 which extends substantially uninterrupted around the circumference of the cap and has a dimension transverse to the direction of gas flow sufficiently small to prevent inward flame propagation.

Figure 13:
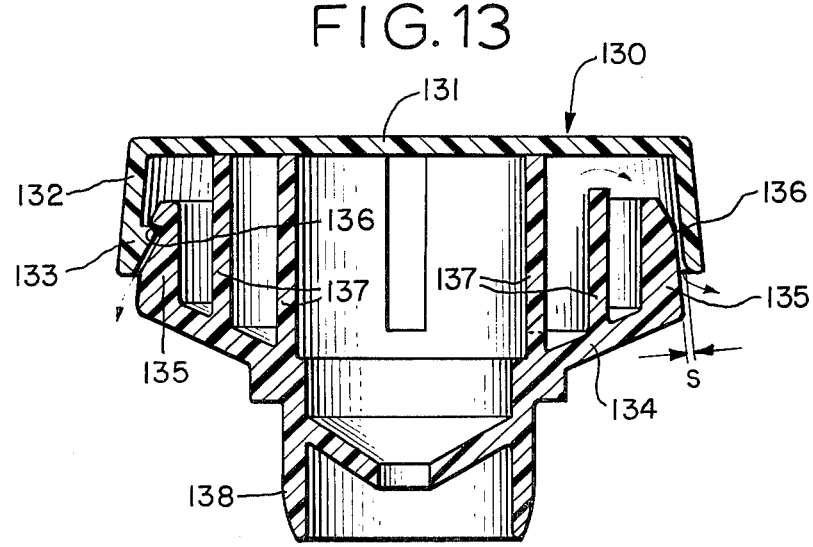
FIG. 13 is a cross-sectional view illustrating another alternative construction for a single cell vented battery cap constructed in accordance with the invention.

In the battery cap 130 of FIG. 13, the cover member 131 includes a sidewall 132 and a plurality of inwardly facing pawl-shaped circumferential latch portions 133. The base member 134 of the cap includes interior walls 137, a vent plug portion 138, and a sidewall 135 having a plurality of ledge portions 136 for engaging latch portions 133. A generally vertical vent aperture 136 similar to vent aperture 129 is found between the inside surface of sidewall 132 and the outside surface of sidewall 135.

Figure 14:
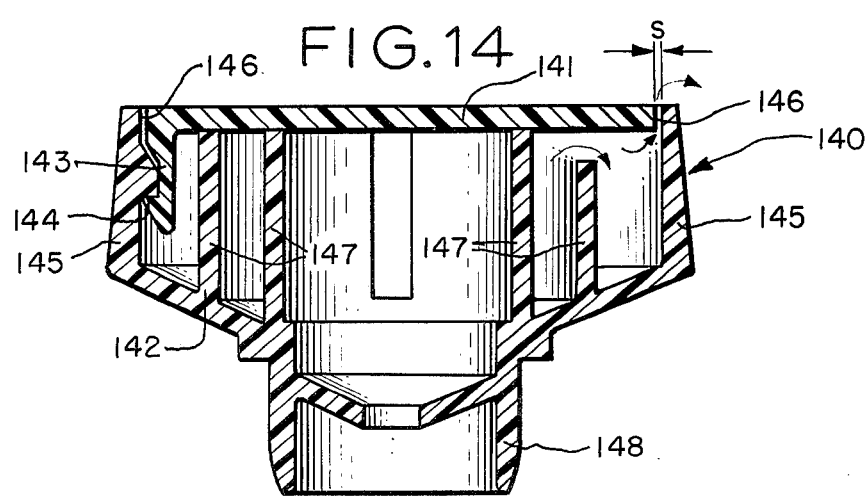
FIG. 14 is a cross-sectional view illustrating another alternative construction for a single cell vented battery cap constructed in accordance with the invention.

In the embodiment of FIG. 14, a vented battery cap 140 includes a cover member 141 secured to a base member 142. The cover member includes a downwardly projecting latch member 143 which engages a ledge portion 144 provided on the base member, which includes a sidewall 145, inner wall portions 147 and a vent plug portion 148. Since the diameter of the cover member is less than the inside diameter of the base member, a generally vertically aligned vent aperture 146 is formed between the rim of the cover member and inside surface of the base member.

Although vent caps have been shown having three vent plug portions for simultaneous venting of three adjacent battery cells, and one vent plug portion for venting a single battery cell, it will be appreciated that the same principle of construction can be applied to vent caps having other numbers of vent plug portions. For example, it would be possible to provide a vent cap having six vent plug portions for simultaneous venting of all six cells of a standard 12 volt automotive-type battery.

The two-piece snap-fit construction of the invention provides a positive engagement between the cover member and the base member without the use of bonding agents or additional components, and without having to make individual adjustments to each cap during manufacture. Furthermore, when the cover member is secured to the base member, a continuous vent aperture is formed which extends around the entire periphery of the vented cap, providing improved dispersion of battery gases and improved protection against explosion.

The vented battery cap of the invention requires only two members, each of which may be formed from thermo-plastic material by conventional injection-molding techniques. Either member can be molded of polypropylene, or the cover member can be molded of a more rigid material such as glass-filled polypropylene, polystyrene, or ABS for improved rigidity, better appearance, and improved hot stamping properties.

While paticular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A vented cap for an electrical storage battery of the type having at least one filler well through which gas and electrolyte are discharged comprising, in combination:

a base member having a bottom portion, a peripheral side wall portion projecting upwardly from said bottom portion and defining an upwardly facing rim portion, at least one hollow vent plug portion projecting downwardly from said bottom portion for insertion into said filler well and including an orifice therein for establishing fluid communication between an interior chamber in said cap and said battery, and an interior wall portion projecting upwardly from said bottom portion and at least partially defining said interior chamber;

a cover member disposed over said base member, said cover member including a downwardly facing rim portion; and means including a plurality of latch portions projecting from one of said base and cover members into snap-fit engagement with the other of said members to secure said cover member in abutting relationship to said interior wall portion, said interior wall portion being dimensioned to maintain said downwardly facing rim portion of said cover member in spaced relationship to the upwardly facing rim of said base member so as to form a vent aperture therebetween for escaping battery gas, said vent aperture having a dimension transverse to the direction of gas flow therethrough less than the flame quenching distance of the battery gas.

2. A vented battery cap as defined in claim 1 wherein said vent aperture extends substantially uninterrupted around substantially the entire periphery of the cap so as to widely disperse gas from said cap while inhibiting inward flame propagation.

3. A vented battery cap as defined in claim 2 wherein said latch portions of said one member each include a pawl surface, and said other member includes an interior rim portion defining a ledge for engaging said pawl surface.

4. A vented battery cap as defined in claim 3 wherein said cover member includes an interior rim portion, and said respective upwardly facing and downwardly facing rim portions of said base and cover members are substantially coextensive and lie in respective substantially parallel spaced-apart planes.

5. A vented battery cap as defined in claim 4 wherein said vent aperture haas a substantially uniform dimension transverse to the direction of gas flow therethrough of less than 0.007 inches.

6. A vented battery cap as defined in claim 1 wherein said latch portions project from said base member, and said cover member includes an interior peripheral ledge portion for lockingly engaging said latch members.

7. A vented cap for an electrical storage battery of the type having at least one filler well through which gas and electrolyte can be discharged comprising, in combination:

a base member having a bottom portion, a peripheral side wall portion projecting upwardly from said bottom portion and defining an upwardly facing peripheral rim, and at least one hollow vent plug portion projecting downwardly from said bottom portion for insertion into the filler well, said vent plug portion including an orifice therein for establishing fluid communication between an interior chamber in said cap and the battery, and an interior wall portion projecting upwardly from said bottom portion and at least partially defining said interior chamber, the upper end of said interior wall portion terminating in a cover-engaging surface;

a cover member having a downwardly facing peripheral rim portion and being disposed in overlying relation on said base; and means including a plurality of latches integrally molded into one of said base and cover members for engaging the other of said members to secure said cover member in abutting relationship to said cover-engaging surface of said interior wall portion, said interior wall portion being dimensioned to provide a substantially continuous gap between said upwardly facing peripheral rim of said base member and said downwardly facing peripheral rim of said cover member to define a gap therebetween, said gap having a dimension transverse to the direction of gas flow therethrough which is less than the flame quenching distance of gases generated in said battery to allow egress of gases from said interior chamber.

8. A vented battery cap as defined in claim 7 wherein said vent aperture extends substantially uninterrupted around substantially the entire periphery of the cap so as to widely disperse gas from said cap while inhibiting inward flame propagation.

9. A vented battery cap as defined in claim 8 wherein said latches on said one member each include a pawl surface, and said other member includes an interior rim portion defining a ledge for engaging said pawl surface.

10. A vented battery cap as defined in claim 7 wherein said vent aperture has a substantially uniform dimension transverse to the direction of gas flow therethrough less than 0.007 inches.

11. A vented cap for an electrical storage battery of the type having a plurality of individual cells each having a filler well comprising, in combination:

an elongated base member having a generally flat bottom portion, a plurality of peripheral side wall portions projecting upwardly from said bottom portion and terminating in an upwardly facing peripheral rim portion, a plurality of hollow vent plug portions projecting downwardly from said bottom portion and arranged for insertion into the filler wells of respective ones of the cells, said vent plug portions each including an orifice therein for establishing fluid communication between an interior chamber in said cap associated therewith and said battery, and a plurality of interior wall portions projecting upwardly from said bottom portion and terminating in a cover-engaging surface;

an elongated cover member disposed in overlying relation on said base member and having a downwardly facing peripheral rim portion substantially coextensive with said upwardly facing rim portion of said base member; and latching means including a plurality of upwardly projecting latch members integrally molded into one of said base and cover members and having pawl surfaces for engaging a ledge portion in the other of said base and cover members to maintain said cover member in abutting relationship to the cover-engaging surface of said interior wall portions, said interior wall portions being dimensioned to provide a substantially continuous vent aperture having a width less than the flame quenching distance of the battery gas between said upwardly facing rim portion of said base member and said downwardly facing rim portion of said cover member to allow egress of battery gas from said cap.

12. A vented battery cap as defined in claim 11 herein said vent aperture has a substantially uniform dimension transverse to the direction of gas flow therethrough of less than 0.007 inches.

13. A vented battery cap as defined in claim 11 wherein said latch members project from said base member, and said ledge portion is integrally formed in said cover member.

14. A vented cap for an electrical storage battery of the type having at least one filler well through which gas and electrolyte are discharged comprising, in combination:

a base member having a bottom portion, a peripheral side wall portion projecting upwardly from said bottom portion and defining a first rim portion, at least one hollow vent plug portion projecting downwardly from said bottom portion for insertion into said filler well and including an orifice therein for establishing fluid communication between an interior chamber in said cap and said battery, and an interior wall portion projecting upwardly from said bottom portion and at least partially defining said interior chamber;

a cover member disposed over said base member, said cover member including a second rim portion; and means including a plurality of latch portions projecting from one of said base and cover members into snap-fit engagement with the other of said members to secure said cover member in abutting relationship to said interior wall portion, said interior wall portion being dimensioned to maintain said second rim portion of said cover member in spaced relationship to said first rim of said base member so as to form a vent aperture therebetween for escaping battery gas, said vent aperture having a dimension transverse to the direction of gas flow therethrough less than the flame quenching distance of the battery gas.

15. A vented battery cap as defined in claim 14 wherein said vent aperture extends substantially uninterrupted around substantially the entire periphery of the cap so as to widely disperse gas from said cap while inhibiting inward flame propagation.

16. A vented battery cap as defined in claim 15 wherein said vent aperture has a substantially uniform dimension transverse to the direction of gas flow therethrough of less than 0.007 inches.

17. A vented cap for an electrical storage battery of the type having a plurality of individual cells each having a filler well comprising, in combination:

an elongated base member having a generally flat bottom portion, a plurality of peripheral side wall portions projecting upwardly from said bottom portion and terminating in a first peripheral rim portion, a plurality of hollow vent plug portions projecting downwardly from said bottom portion and arranged for insertion into the filler wells of respective ones of the cells, said vent plug portions each including an orifice therein for establishing fluid communication between an interior chamber in said cap associated therewith and said battery, and a plurality of interior wall portions projecting upwardly from said bottom portion and terminating in a cover-engaging surface;

an elongated cover member disposed in overlying relation on said base member and having a second peripheral rim portion substantially coextensive with said upwardly facing rim portion of said base member; and latching means including a plurality of inwardly projecting latch members integrally molded into one of said base and cover members and having pawls surfaces for engaging a ledge portion in the other of said base and cover members to maintain said cover member in abutting relationship to the cover-engaging surface of said interior wall portions, said interior wall portions being dimensioned to provide a substantially continuous vent aperture having a width less than the flame quenching distance of the battery gas between said first rim portion of said base member and said second rim portion of said cover member to allow egress of battery gas from said cap.

18. A vented battery cap as defined in claim 17 wherein said vent aperture has a substantially uniform dimension transverse to the directon of gas flow therethrough of less than 0.007 inches.

19. A vented battery cap as defined in claim 18 wherein said latch members project from said base member, and said ledge portion is integrally formed in said cover member.

* * * * *

UNITED STATES PATENT AND TRADEMARK OFFICE
CERTIFICATE OF CORRECTION

PATENT NO. : 4,098,963
DATED : July 4, 1978
INVENTOR(S) : Verlin A. Mocas

It is certified that error appears in the above-identified patent and that said Letters Patent are hereby corrected as shown below:

Column 2, line 26, "molede" should read --molded--
Column 2, line 37, "belived" should read --believed--
Column 2, line 48, "202" should read --2-2--
Column 5, line 31, "shuld" should read --should--
Column 6, line 8, "." should read --,--
Column 6, line 31, "whithin" should read --within--
Column 6, line 51, "AS" should be --As--
Column 8, line 66, "haas" should read --has--
Column 10, line 22, "herein" should read --wherein--

Signed and Sealed this

Twenty-second Day of January 1980

[SEAL]

Attest:

SIDNEY A. DIAMOND

Attesting Officer

Commissioner of Patents and Trademarks